United States Patent Office 2,796,425
Patented June 18, 1957

2,796,425

DITHIOCYANO-1,4-NAPHTHOQUINONES AND METHOD FOR PREPARING SAME

Mario Scalera and Tsai H. Chao, Somerville, N. J., assignors to American Cyanamid Company, New York, N. Y., a corporation of Maine No Drawing. Application October 26, 1955,
Serial No. 543,021

8 Claims. (Cl. 260—454)

This invention relates to new compositions of matter and particularly to new naphthoquinones. More specifically, it relates to certain substituted dithiocyano naphthoquinones which can be represented by the general formula:

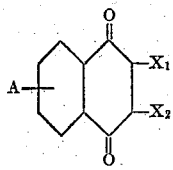

where $X_1$ and $X_2$ means thiocyano (—SCN) or thiocyanomethyl (—CH$_2$SCN) and A is hydrogen or a nitro group.

The compounds possess good fungicidal activity. They may be conveniently prepared by reacting approximately one mole of an appropriate 2,3-dihalo-1,4-naphthoquinone compound with two moles of a water soluble salt of thiocyanic acid. Illustrative thiocyanates include sodium thiocyanate, potassium thiocyanate, lithium thiocyanate, ammonium thiocyanate and the like. The 1,4 naphthoquinone compound may be represented by the formula:

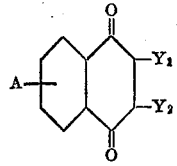

where A is either hydrogen or a nitro group and $Y_1$ and $Y_2$ are each a halo or halomethyl group. Preferably, the reaction is conducted in the presence of an inert non-hydroxylated organic solvent such as acetone, ethyl ether or ethyl acetate.

To facilitate a further understanding of the invention, the following examples are given for purposes of illustrating certain more specific details thereof. Unless otherwise noted, the parts are by weight.

EXAMPLE 1

*2,3-dithiocyano-1,4-naphthoquinone*

To 60 parts of acetone are added 4.5 parts of 2,3-dichloro-1,4-naphthoquinone and 4.5 parts of potassium thiocyanate. The mixture is then heated at the reflux temperature for two and one-half hours to complete the reaction. It is then filtered and the filter cake is dried in the air. Solid product is then slurried in water and removed by filtration and dried. A good yield of 2,3-dithiocyano-1,4-naphthoquinone, having a melting point of 235°–240° C., is obtained and analyzes as follows:

Calc'd for C$_{12}$H$_4$S$_2$N$_2$O$_2$·½ H$_2$O: C, 51.2; H, 1.8; O, 13.9; N, 10.0; S, 22.8. Found: C, 50.4; H, 1.7; O, 14.3; N, 10.3; S, 23.1.

EXAMPLE 2

*2,3-bis (thiocyanomethyl)-1,4 naphthoquinone*

To 120 parts of acetone are added 7.8 parts of 2,3-bis (chloromethyl)-1,4 naphthoquinone and 5.7 parts of potassium thiocyanate. The mixture is heated at the reflux temperature for two hours until the reaction is complete. When the mixture cools to room temperature, potassium chloride precipitates. This precipitate is removed by filtration and the acetone filtrate is drowned in 300 parts of water. A solid product which separates is removed by filtration and washed with water and dried. A good yield of 2,3-bis (thiocyanomethyl)-1,4-naphthoquinone is obtained. The melting point of the latter compound after recrystallization from alcohol-acetone is found to be 179°–180° C. and analyzes as:

Calc'd for C$_{14}$H$_8$S$_2$N$_2$O$_2$: C, 56.1; H, 2.6; S, 21.3; N, 9.51. Found: C, 56.1; H, 2.66; S, 21.2; N, 9.34.

EXAMPLE 3

*2,3-bis (thiocyano)-5-nitro-1,4-naphthoquinone*

13.6 parts of 2,3-dichloro-5-nitro-1,4-naphthoquinone and 10.5 parts of potassium thiocyanate are added to 120 parts of acetone. The mixture is heated under reflux conditions for one and one-half hours until the reaction is complete. Resultant reaction mixture is then cooled. The 2,3-bis (thiocyano)-5-nitro-1,4-naphthoquinone compound precipitates. It is removed by filtration, washed with water and dried. 15 parts of product, which has a melting point in excess of 270° C., is obtained. This represents a yield of approximately 97% based on weight of 2,3-dichloro-5-nitro-1,4 naphthoquinone. The compound, recrystallized from alcohol, analyzes as follows:

Calc'd for C$_{12}$H$_3$N$_3$S$_2$O$_4$·H$_2$O: C, 43.0; H, 1.5; N, 12.6; S, 19.2. Found: C, 42.3; H, 1.5; N, 13.3; S, 19.4.

As previously stated, the above described compounds are valuable fungicides. For example, they are highly effective against the spores of *Sclerotinia fructigena* and *Macrosporium sarcinaeforme* which are known parasites. They cause extensive damage to clover and stone fruit crops, such as peaches. The following example is provided to demonstrate the effectiveness of the dithiocyano compounds of this invention.

EXAMPLE 4

Spores are obtained in abundance from 7-day old slants of *Macrosporium sarcinaeforme* and 14-day old cultures of *Sclerotinia fructigena*. The spores are prepared in aqueous suspension and their concentration is adjusted to approximately 50,000 spores per cc. of water. An aqueous solution of the dithiocyano compound to be added to the suspension is prepared in concentrations ranging from 0.01% to 0.0001%. 3.75 cc. of the aqueous solution is then added to 0.25 cc. of the spore suspension in a small vial. The vial is stoppered and secured in a tumbler and is rotated to provide intimate contact of the chemical and the organism. After a 20-hour exposure of the spore suspension to the test compound, the spores are removed from the vials and the percent germination is determined. The results are tabulated below:

| Compound | Percent Kill | | | | |
|---|---|---|---|---|---|
| | Sclerotinia fructigena, Percent Concentration | | | Macrosporium sarcinaeforme, Percent Concentration | |
| | .01 | .001 | .0001 | 0.001 | 0.0001 |
| 1,4-Naphthoquinone: | | | | | |
| 2,3-bis (thiocyanomethyl) | | | 95 | 95 | 50 |
| 2,3-bis (thiocyano)-5-nitro | 95 | | | 95 | |
| 2,3-dithiocyano | | 95 | 50 | 95 | |

What is claimed is:
1. The compound represented by the formula:

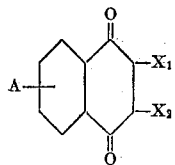

wherein $X_1$ and $X_2$ are each a radical selected from the group consisting of thiocyano and thiocyanomethyl and A is selected from the group consisting of hydrogen and a nitro radical.

2. 2,3-dithiocyano-1,4-naphthoquinone.
3. 2,3-bis (thiocyanomethyl)-1,4-naphthoquinone.
4. 2,3-bis (thiocyano)-5-nitro-1,4-naphthoquinone.
5. A process for preparing a thiocyano compound represented by the formula:

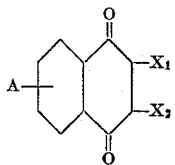

wherein $X_1$ and $X_2$ are each a radical selected from the group consisting of thiocyano and thiocyanomethyl and A is selected from the group consisting of hydrogen and nitro radical which comprises: reacting one mole of the compound:

wherein $Y_1$ and $Y_2$ are selected from the group consisting of halo and halomethyl radicals and A is selected from the group consisting of hydrogen and a nitro radical, with two moles of a water soluble salt of thiocyanic acid in the presence of an inert organic solvent; and recovering the thiocyano naphthoquinone compound.

6. A process for preparing: 2,3-dithiocyano-1,4-naphthoquinone which comprises: reacting one mole of 2,3-dichloro-1,4-naphthoquinone with two moles of potassium thiocyanate under reflux temperatures in the presence of acetone, and recovering 2,3-dithiocyano-1,4-naphthoquinone.

7. A process for preparing 2,3-bis (thiocyanomethyl)-1,4-naphthoquinone which comprises: reacting one mole of 2,3-bis (chloromethyl)-1,4-naphthoquinone with two moles of potassium thiocyanate in the presence of acetone, and recovering 2,3-bis (thiocyanomethyl)-1,4-naphthoquinone.

8. A process for preparing 2,3-bis (thiocyano)-5-nitro-1,4-naphthoquinone which comprises: reacting one mole of 2,3-dichloro-5-nitro-1,4-naphthoquinone with two moles of potassium thiocyanate in the presence of acetone, and recovering 2,3-bis (thiocyano) - 5 - nitro - 1,4 - naphthoquinone.

No references cited.